(12) United States Patent
Reza

(10) Patent No.: US 9,398,064 B2
(45) Date of Patent: *Jul. 19, 2016

(54) METHOD OF STREAMING MEDIA TO HETEROGENEOUS CLIENT DEVICES

(71) Applicant: XINLAB, INC., Milpitas, CA (US)

(72) Inventor: Areef Reza, Ottawa (CA)

(73) Assignee: VUCLIP (SINGAPORE) PTE. LTD., Singapore (SG)

( * ) Notice: Subject to any disclaimer, the term of this patent is extended or adjusted under 35 U.S.C. 154(b) by 53 days.

This patent is subject to a terminal disclaimer.

(21) Appl. No.: 14/556,477

(22) Filed: Dec. 1, 2014

(65) Prior Publication Data

US 2015/0089076 A1 Mar. 26, 2015

Related U.S. Application Data

(63) Continuation of application No. 13/386,487, filed as application No. PCT/CA2010/001129 on Jul. 22, 2010, now Pat. No. 8,903,895.

(60) Provisional application No. 61/227,683, filed on Jul. 22, 2009.

(51) Int. Cl.
  *G06F 15/16* (2006.01)
  *H04L 29/06* (2006.01)
  *H04N 21/2343* (2011.01)
  *H04N 21/472* (2011.01)

(52) U.S. Cl.
  CPC .......... *H04L 65/602* (2013.01); *H04N 21/2343* (2013.01); *H04N 21/47214* (2013.01)

(58) Field of Classification Search
  CPC .............. H04N 21/2343; H04N 21/00; H04N 21/4402; G06F 21/10; G06F 17/289; G06F 17/30902
  USPC .............. 709/203, 219, 228, 231; 725/87–88, 725/90–91; 370/328, 352
  See application file for complete search history.

(56) References Cited

U.S. PATENT DOCUMENTS

| | | | | |
|---|---|---|---|---|
| 7,783,613 | B2 * | 8/2010 | Gupta | H04L 67/2823 707/693 |
| 2004/0010614 | A1 * | 1/2004 | Mukherjee | H04L 29/06027 709/231 |
| 2012/0216038 | A1 * | 8/2012 | Chen | H04L 9/083 731/168 |
| 2013/0124691 | A1 * | 5/2013 | Suryavanshi | H04L 67/06 709/219 |

* cited by examiner

*Primary Examiner* — Hitesh Patel
(74) *Attorney, Agent, or Firm* — Lynn C. Schumacher; Stephen W. Leonard; Hill & Schumacher

(57) ABSTRACT

A method of dynamically preparing a media clip for delivery from a server to a client is provided. Media attributes comprising media playback formats compatible with the client are provided to the server. A request is made by the client to provide a media content item at a specified starting time, and the server identifies a source where a media content file related to the selected media content item is located. The server obtains the media file from the source, and obtains a transcoded media segment file having a playback format compatible with the client media attributes. The transcoded media segment file may further be prepared in a transport format that is compatible with transport format media attributes of the client device, and a location of the prepared transcoded media segment file may be communicated to the client for the client to access the media segment.

18 Claims, 4 Drawing Sheets

METHOD OF STREAMING MEDIA TO HETEROGENEOUS CLIENT DEVICES

CROSS-REFERENCE TO RELATED APPLICATION

This application is a Continuation Application of National Phase application Ser. No. 13/386,487, with a filing date of Apr. 12, 2012, now U.S. Pat. No. 8,903,895, issued Dec. 2, 2014, claiming the benefit of PCT/CA2010/001129, filed on Jul. 22, 2010, in English, which further claims priority to U.S. Provisional Application No. 61/227,683, titled "METHOD AND APPARATUS FOR SEAMLESS VIDEO STREAMING TO MOBILE DEVICES" and filed on Jul. 22, 2009, the entire contents of which are incorporated herein by reference.

FIELD OF THE INVENTION

The present invention relates to digital media streaming, and more particularly, the present invention relates to a system and method for streaming digital media to heterogeneous client devices.

BACKGROUND OF THE INVENTION

Video streaming from a server to a client entity presently faces many engineering challenges. For example, network connected devices come in different screen sizes and CPU power; media optimized for one device (say, a PC) may not be viewable on other devices (say, a cell phone). Not all device supports the same streaming technology (e.g., RTSP streaming) or the same codec (e.g., some supports mp4, some may not).

When watching a video content on the PC, it is typically not possible or not straight forward to find the same video to watch on a mobile phone. Furthermore, it is even more challenging to watch from the middle of a video content on a phone where the first half was already viewed on a PC.

Traditionally when a video streaming starts from a video server, the server, content, delivery mechanism, etc. remain the same for the duration of the session. This imposes a restriction when multiple devices request access to the same stream within the same streaming session.

Accordingly, it would be advantageous to provide a system for video streaming from a server that addresses the above-mentioned challenges.

SUMMARY OF THE INVENTION

In a first aspect, there is provided a method of dynamically preparing a media clip for delivery from a server to a client, the client comprising a client device and a media application for providing media playback on the client device, the method comprising the steps of receiving media attributes from the client, the media attributes comprising one or more playback formats compatible with the client; receiving from the client a request to provide a media segment comprising a selected segment of a selected media content item, the request defining a starting offset of the media segment; identifying a source where a media content file relating to the selected media content item is stored; obtaining the media content file from the source; and obtaining a transcoded media segment file comprising a transcoded segment of the media content file, wherein the transcoded media segment file comprises a playback format selected from the media attributes. The step of obtaining a transcoded media segment file comprises generating a transcoded file comprising the selected segment of the media file. The method may be repeated for one or more additional clients.

At least one of the media attributes is preferably selected from the group consisting of frame rate, resolution, aspect ratio, encoding rate, audio codec, and video codec. The media attributes may further comprise a preferred playback format, and wherein the playback format selected from the media attributes is the preferred playback format.

The media attributes may further comprise a content format; wherein the step of identifying a source comprises identifying one or more sources (which may comprise a single source) where media files related to the selected media content item are stored; and wherein the step of obtaining the media content file from the source comprises selecting a media file from the media files, wherein the selected media file comprises a content format selected from the media attributes. The media attributes may further comprise a preferred content format, and wherein the content format selected from the media attributes is the preferred content format. At least one of the media attributes is preferably selected from the group consisting of content language, content edition, content subtitles, and content censorship.

The step of identifying a source where a media file relating to the media content item is stored preferably comprises the step of identifying the selected media content item from a list of available media content items; wherein the list further comprises at least one source of at least one media file related to the selected media content item.

The source may comprise a cached copy of the media file, and one or more of the media content file and the transcoded media segment file may be cached. The cached copy of the media file may comprises a segment substantially matching the selected segment, and wherein the media file comprises a playback format selected from the media attributes, wherein the transcoded media segment file is obtained from the cached copy of the media file.

Prior to receiving the request to provide a segment of a selected media content item, media content availability information may provided to the client, wherein the media content availability information relates to at least a portion of the list of available media content items.

The media attributes preferably further comprise one or more transport formats compatible with the client, the method further comprising the steps of selecting a transport format from the media attributes; preparing the transcoded media segment file for delivery according to the transport format; and communicating a location of the prepared transcoded media segment file to the client. The media attributes may further comprise a preferred transport format, and wherein the transport format selected from the media attributes is the preferred transport format. At least one of the media attributes is preferably selected from the group consisting of hypertext transfer protocol, real time streaming protocol, file transfer protocol, and adaptive hypertext transfer protocol streaming.

The request may be provided after the client is disconnected while streaming a previously generated prepared transcoded media segment, wherein the starting offset is an offset during the previously generated prepared transcoded media segment when the streaming of the previously generated prepared transcoded media segment was disconnected. The previously generated prepared transcoded media segment may have been prepared by the server. Alternatively, the previously generated prepared transcoded media segment may have been prepared by a different server, and wherein the currently prepared transcoded media segment is generated using a different transport format than a transport format employed when streaming the previously generated prepared transcoded media segment, and wherein the different transport format is selected from the media attributes.

The request may be provided after a previous client is disconnected while streaming a previously generated prepared transcoded media segment, and wherein the starting offset is an offset during the previously generated prepared transcoded media segment when the streaming of the previously generated prepared transcoded media segment was disconnected.

The current client may comprise media attributes that are different from media attributes of the previous client.

The request may comprise metadata associated with semantic content of the selected media content item. The selected media content item is preferably related to any one of a video segment, an audio and video segment, and an image. Statistical information relating to the requests for the delivery of the media content item is preferably recorded.

In another aspect, there is provided a method of dynamically receiving a media clip on a client, the client comprising a client device and a media application for providing media playback on the client device, the method comprising the steps of communicating client media attributes from the client to a server, the media attributes comprising a playback format and a transport format compatible with the client; receiving from the server a list of available media content items; allowing a user to select a media content item from the list; allowing the user to identify a media segment of the media content item by selecting a starting offset; communicating with the server to request dynamic preparation of the media segment; receiving from the server a location of a prepared transcoded media segment file comprising a transcoded media segment file prepared in a format for delivery to the client, wherein the transcoded media segment file comprises a transcoded segment of a media file related to the media content item, and wherein the transcoded media segment file comprises a playback format selected from the media attributes, and wherein the prepared transcoded media segment file comprises a transport format selected from the media attributes; and obtaining the transcoded media segment file from the location for playback on the client device. The method preferably comprises the step of playing the transcoded media segment file on the client device.

At least one of the media attributes may comprise a playback format attribute selected from the group of consisting of frame rate, resolution, aspect ratio, encoding rate, audio codec, and video codec. At least one of the media attributes is preferably a transfer protocol attribute selected from the group consisting of hypertext transfer protocol, real time streaming protocol, file transfer protocol, and adaptive hypertext transfer protocol streaming.

The media attributes may further comprise a preferred playback format, and wherein the playback format selected from the media attributes is the preferred playback format. Preferably, the media attributes further comprise a preferred transport format, and wherein the transport format selected from the media attributes is the preferred transport format.

The media attributes may further comprise a content format, and wherein the media file related to the media content item comprises a content format selected from the media attributes. Preferably, the media attributes further comprise a preferred content format, and wherein the content format selected from the media attributes is the preferred content format.

At least one of the media attributes is preferably a content format attribute selected from the group consisting of content language, content edition, content subtitles, and content censorship.

The client device may be selected from the list comprising a cell phone, a smartphone, a tablet, a portable media player, and a computer.

The playing of the transcoded media segment file on the client device may be interrupted, in which case the method may further comprising the steps of recording an offset in the selected media segment file when the interruption occurred; re-establishing communication with the server; and obtaining the transcoded media segment file from the location for playback on the client device.

Alternatively, if the playing of the transcoded media segment file on the client device is interrupted, the method may further comprise the steps of recording an offset in the transcoded media segment file when the interruption occurred; and establishing communication with another server, wherein the media content item is available from the another server; communicating the client media attributes to the another server; identifying a new media segment of the media content item by selecting a starting offset corresponding to the offset in the transcoded media segment file when the interruption occurred; communicating with the another server to request dynamic preparation of the new media segment; receiving from the another server a location of a new prepared transcoded media segment file comprising a new transcoded media segment file prepared in a format for delivery to the client, wherein the new transcoded media segment file comprises a transcoded segment of the media file related to the media content item, and wherein the new transcoded media segment file comprises a playback format selected from the media attributes, and wherein the new prepared transcoded media segment file comprises a transport format selected from the media attributes; and obtaining the new transcoded media segment file from the location for playback on the client device. The transport format of the new prepared transcoded media segment file may be different from a transport format of the prepared transcoded media segment file that was prepared prior to the interruption.

Prior to the step of receiving from the server the first list of available media content items, the following steps may be performed: communicating with the server to access a user account associated with the user; receiving a second list of media content items comprising media content items previously viewed by the user; wherein the step of allowing the user to select a media content item from the first list further comprises the step of allowing the user to select a media content item from the second list.

If the previously viewed media content item was stopped during playback by the user during a previous viewing session, and wherein an offset at which playback of the media content item was stopped is recorded in the user account; then the step of allowing the user to identify a media segment of the previously viewed media content item by selecting a starting offset may comprise the step of allowing the user to select the offset at which playback of the media content item was stopped. The client may be different than a client used during the previous viewing session.

Prior to the step of receiving from the server the first list of available media content items, the following steps may be performed: communicating with the server to access a user account associated with the user; receiving an additional list of media content items from another user; wherein the step of allowing the user to select a media content item from the first list further comprises the step of allowing the user to select a media content item from the additional list.

The method may further comprise the steps of communicating with the server to access a user account associated with the user; and allowing the user to share the media content item with an additional user.

The media content item is preferably related to any one of a video segment, an audio and video segment, and an image, and the client device is preferably selected from the list comprising a cell phone, a smartphone, a tablet, a portable media player, and a computer. The client may further comprise a user interface in communication with the server, the user interface displaying the list to the user.

A further understanding of the functional and advantageous aspects of the present invention can be realized by reference to the following detailed description and drawings.

BRIEF DESCRIPTION OF THE DRAWINGS

Preferred embodiments of the invention will now be described, by way of example only, with reference to the drawings, in which.

DETAILED DESCRIPTION OF THE INVENTION

Figure 1:
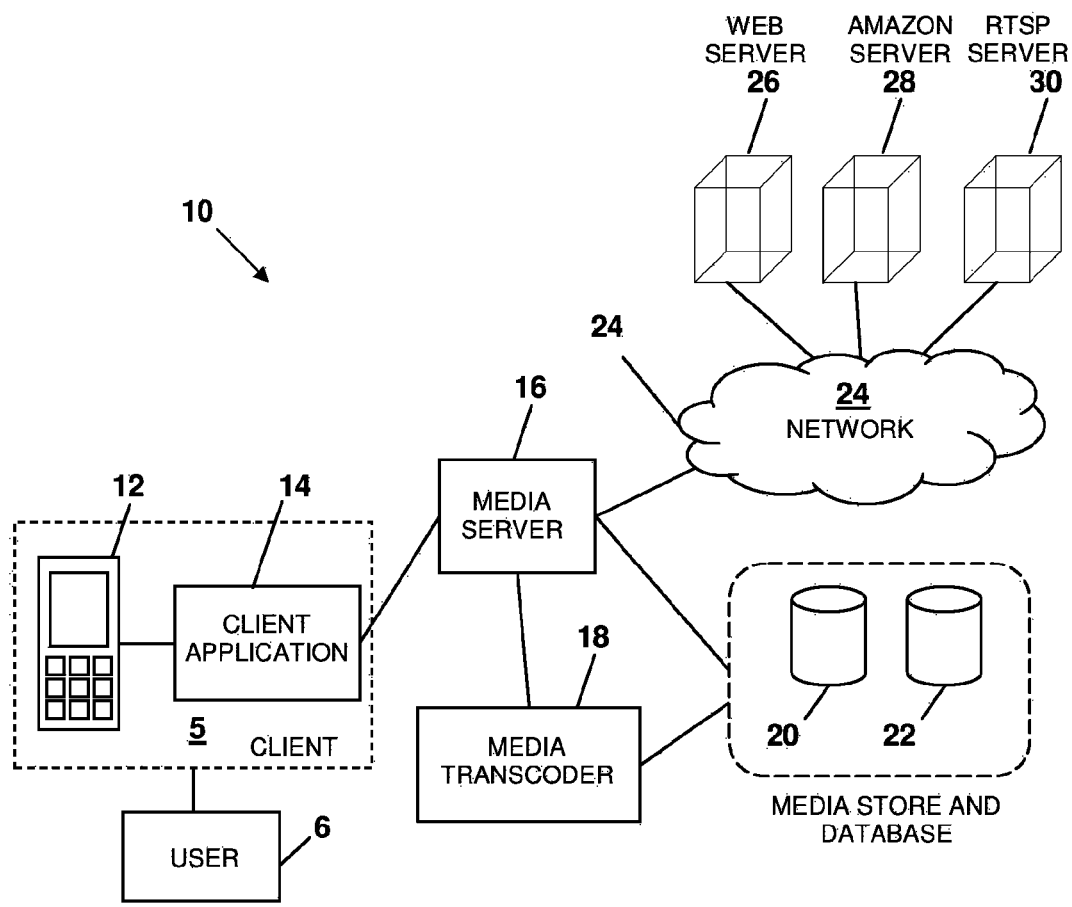
FIG. 1 is a diagram of a system for streaming video content from one or more media servers to one or more clients.

Without limitation, the majority of the systems described herein are directed to systems and methods for transmitting digital media. As required, embodiments of the present invention are disclosed herein. However, the disclosed embodiments are merely exemplary, and it should be understood that the invention may be embodied in many various and alternative forms.

The Figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention. For purposes of teaching and not limitation, the illustrated embodiments are directed to systems and methods for transmitting digital video clips.

As used herein, the term "about", when used in conjunction with ranges of dimensions or other physical properties or characteristics is meant to cover slight variations that may exist in the upper and lower limits of the ranges of dimensions as to not exclude embodiments where on average most of the dimensions are satisfied but where statistically dimensions may exist outside this region. For example, in embodiments of the present invention configurations of video streaming systems are given but it will be understood that these are not meant to be limiting.

As used herein, the terms "comprises", "comprising", "includes" and "including" are to be construed as being inclusive and open ended, and not exclusive. Specifically, when used in this specification including claims, the terms "comprises", "comprising", "includes" and "including" and variations thereof mean the specified features, steps or components are included. These terms are not to be interpreted to exclude the presence of other features, steps or components.

As used herein, the coordinating conjunction "and/or" is meant to be a selection between a logical disjunction and a logical conjunction of the adjacent words, phrases, or clauses. Specifically, the phrase "X and/or Y" is meant to be interpreted as "one or both of X and Y" wherein X and Y are any word, phrase, or clause.

As used herein, the acronym "RTSP" refers to Real Time Streaming Protocol which is a transfer protocol designed for transmission of media; the acronym "HTTP" refers to "Hypertext Transfer Protocol" which is a transfer protocol designed for the transmission of web pages; and the acronym "FTP" refers to File Transfer Protocol which is a transfer protocol designed for the transmission of digital files.

As used herein, the term "transcoding" refers to the conversion of digital media from one digital encoding to another. If the second encoding is lossy, signal content will be lost in the conversion operation. As an example, one encoding of digital video may be H.264 and another encoding may be WMV.

Referring to FIG. 1, an exemplary and non-limiting system 10 is shown for illustrating selected embodiments in which media content is provided to a client 5. The system includes a media server 16, which provides media content to a client comprising a client application 14 that is executed on client device 12 such as a phone, tablet, personal computer, portable media player, or other computing and/or media presentation device. The client device is operated by user 6, and the client application 14 includes a user interface for interacting with user 6. Client application 14 includes computer readable instructions stored on computer readable memory and may be referred to as a "media application."

Media server 16 accesses media to that is to be streamed and client application 14 is capable of decoding and playing media content (such as a media content stream) on the client device 12. Media server 16 may access media stored in a content management system including media store 20 and media database 22. Further, the media server 16 is connected to a network 24 (preferably the internet), which may connect to additional servers such as a web server 26, an Amazon™ media 28, and a RTSP server 30. The media server 16 has a media transcoder 18 which may be a separate machine from the media server 16, or it may be a program running on the media server 16. The media transcoder 18 may be a device connected over a network.

While the present system is directed to a method of streaming video, the system may be applied to any media content such as audio and images. In FIG. 1, a cell phone 12 is shown as running the client application 14, though other digital devices may serve as the client device 14 such as a smartphone, portable media player, desktop computer, or a tablet computer.

According to selected embodiments, a method of providing media to a client 5 employs a hierarchical system for categorizing or metadata tagging media. At the highest level for example, a media metadata tag may specify a movie title, at an intermediate level, a media tag may specify a viewing language, and at the lowest level, a media tag may specify a specific file representing digital media content. These examples of tag levels are meant to be exemplary and those skilled in the art would appreciate that a hierarchical tagging system may employ different media tags. For example, language may be the highest level in the hierarchy. As disclosed below, such categorization or metadata tagging of media content supports a method in which media content compatible with a client's media attributes can be dynamically provided.

By way of example, a media content item may be defined by a metadata such as a global video identifier (VID) that identifies a video by its semantic content, as opposed to by its digital encoding or formatting. There may be many copies of a video with the same VID, each with a different audio content, screen size, encoding parameters, subtitles, etc. For example, it is possible to have a video dubbed in a different language than the original, the two sharing the same VID. In other words VID is not a sufficient identifier to identify a video in its original source form. One example of a VID is a title of a movie, which is generic and can be applied to describe multiple media files of the same movie, but having different properties such as the presence or absence of subtitles, or the censorship status of the media item.

Considering now the client 5, the capability of the client receiving and playback of media playback and transport formats may be described and provided to the server 16. Such capability, or compatibility, of the client 5 may be referred to as media attributes (MAT). Non-limiting examples of media playback format attributes include the following: frames per second, spoken language, optimized screen size, encoding rate (audio, video), codec used, and many other attributes. Non-limiting examples of media transport format attributes include the following: RTSP, HTTP, adaptive HTTP streaming, FTP, and BitTorrent.

It is to be understood that media attributes may describe the capabilities or compatibility of a client, and that the media attributes may comprise more than one compatible media playback format attribute and/or media transport attribute. For example, a client 5 may be capable of playback of multiple encoding formats, or accepting multiple transport formats. In a preferred embodiment, the client media attributes comprise preferred media attributes, where the preferred media attributes may be selected by a media server for providing media content in a preferred playback or content format.

The media attributes of the client preferable further comprise preferred content format of media to be provided to, and played back, on the device. Content format media attributes may include, for example, a preferred language, and a preference for the display of subtitles. By providing content format media attributes to a server, a specific media file compatible with the client content media attributes may be selected when a media content item is specified. For example, if a specific movie title is selected as a media content item, the server, armed with the knowledge of the client media content format attributes, may select an appropriate version (i.e. specific media file) to generate and provide to the client.

It is also to be understood that a specific media file, which may relate to a media content item, may be described in terms of specific media attributes, such as the encoding format of the media file. Accordingly, in one embodiment, a specific media file may be identified the media content item and the media attributes of the file, for example, by a 2-tuple such as {VID, MAT}.

A segment of a specific media file may be identified by the starting time of the media segment, and optionally the ending time of the media segment. In one exemplary embodiment, a video clip identifier (VCID) may be used to identify a subset of a media file, where the VCID comprises a VID, a millisecond offset (Off), a millisecond length (Len), and a MAT. The offset denotes the starting point of the clip; the length indicates the running time of the clip from its start. Accordingly, in this exemplary embodiment, a 3-tuple {VID, Off, Len} may be termed as a Video Clip Identifier or a VCID. The 4-tuple {VID, Off, Len, MAT} may be termed as a Fully Qualified VOID, or FQID.

As described above, media content from a media server 16 may be prepared and delivered to a client in a dynamic fashion. A client may send a request to a server (e.g. media server 16) in which a media content item is selected for delivery. For example, a video clip may be selected by sending its VCID to the server. The media server 16 responds by providing a media file matching the request, where the media file is formatted and transported according to the media attributes of the client, which have been provided to the server.

The media file is preferably dynamically transcoded according the media playback attributes of the client, and transported according to the media transport attributes of the client. For example, if the current delivery mechanism chosen is RTSP, the media server 16 automatically skips to the Offset of the clip and automatically stops the session when it reaches the Length of the clip. If the current delivery mechanism is HTTP, FTP or BitTorrent for example, the media server 16 creates an appropriate video file dynamically with appropriate headers such that the video starts at Offset and ends at the Length. This is described in more detail below.

Figure 2:
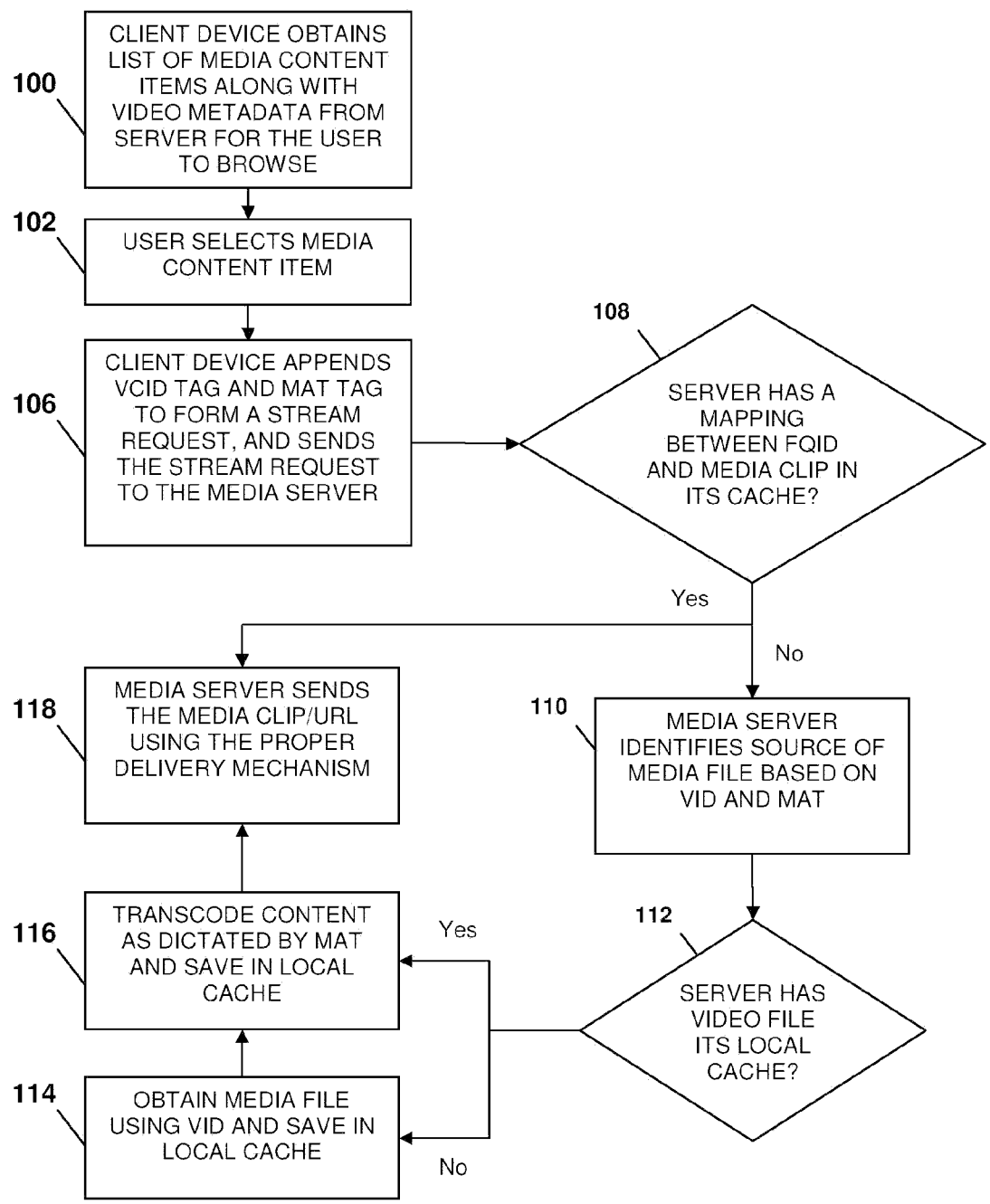
FIG. 2 is a flow chart diagram illustrating an example method for obtaining a video server from a media server.

Referring to FIG. 2, a flow chart is provided that illustrates a preferred method of providing a media file from a server 16 to client 5. In step 100, the client obtains, from the server, a list of media content items that are available for delivery. Such media content items may preferably be described by VCID tags that uniquely identifies a video clip, where the server maintains a list comprising the VCID tags and one or more sources where a media file relating to the VOID tag may be obtained. In selected embodiments, such VCID tags can be obtained from an online site, or via email, or similar sources.

In step 102, the user selects a media content item a client 5 to request for delivery from the server 16. The client may display user interpretable information such as the title of a movie, which may be cross-referenced with a VCID or other metadata record that specifically identifies the video content item in a format that can be understood by the server.

In step 106, the client 5 provides the request for the media content item to the media server 16. The address of such a media server can either be preconfigured at the client, or can be found from a designated website, or from a discovery service. In one embodiment, the client contacts a proxy server (not shown in FIG. 1) which functions as a load balancer. The load balancer can redirect this request to any number of media servers 16. In a preferred embodiment, the client employs a set of preconfigured DNS addresses for communicating with the proxy server. If the first preconfigured DNS address does not lead to a successful connection, the client 16 uses the next preconfigured DNS address.

The client 5 preferably issues a request to media server 16 by providing passing the VCID along with the client MAT. As described above the MAT identifies media attributes of the client, which may include playback format attributes, transport format attributes, and media content attributes, and may contain more than one alternative for each attribute.

XML listing 1, as shown below, provides an example of how such a request may be provided to media server 16 as an XML fragment. In the example below, 240×320 pixels is the preferred resolution; 64 is the preferred video bit-rate; 3gp and mp4 are the preferred video containers; h.263 and h.264 the two preferred video codecs; aac, amr-nb, amr-wb, mp3 are the preferred audio codecs; 32 is the preferred audio bit-rate; between 10 and 30 frames per second is the preferred framerate range; English is the preferred language; RTSP or HTTP is the preferred delivery protocol; and 60 seconds is the preferred clip size (explained later) when HTTP is the delivery protocol.

XML Listing 1: Example Request

```
<request>
    <vcid>
        <vid>http://www.company.com/videoid/
            34546KBK234.xml</vid>
        <off unit="sec">140</off>
        <len unit="sec">3600</len>
    </vcid>
    <mat>
        <screen>240x320</screen>
        <container>3gp,mp4</container>
        <videocodec>h.263, h.264</videocodec>
        <videobitrate>64</videobitrate>
        <acodec>aac, amr-nb, amr-wb, mp3</acodec>
        <audiobitrate>32</audiobitrate>
        <framerate>10-30</framerate>
        <lang>en</lang>
        <delivery>rtsp</delivery>
        <delivery splitsec=60>http</delivery>
    </mat>
</request>
```

In step 108, the media server 16 receives the request sent in step 106, and identifies whether a media segment file having media playback attributes common with the client media attributes is resident in its local cache. Such a case may occur when the server 16 has already responded to the request in the past (for example, the FQID={VCID, MAT} combination is in its local cache). If such a copy exists, then the server responds directly in step 118, as described further below.

If the media file has not been previously cached, then in step 110, the media server 16 looks up the media content item (e.g. the VID) and identifies a source for a media file related to the media content item. In one embodiment, the source for a media file related to a media content item is specified by an XML description, such as XML Listing 2 as shown below. In this example, the media server 16 has locates the XML video description file based on the VID. Here the exemplary VID is a URL, and the XML video description file is located at the URL. Alternatively, the VID may be a portion of a URL such as "34546KBK234.xml" in this example, where the media server 16 may obtain the XML description file by appending a base URL (e.g. "http://www.company.com/videoid/") with the VID. In another alternative embodiment, the VID may be an arbitrary string and the media server 16 has a list (e.g. a lookup table) describing the relationship between a media content item (e.g. a VID) and a source (e.g. an XML description file).

XML Listing 2: Example Video

```
<video>
    <content>
        <lang>en</lang>
        <title>The Golden Compass</title>
        <url>
        http://www.company.com/content/34546KBK234.flv
        </url>
    </content>
    <content>
        <lang>fr</lang>
        <title>
            À la croisée des mondes - La boussole d'or
        </title>
        <url>
        http://www.company.com/content/34546KBK234_fr.flv
        </url>
    </content>
</video>
```

This exemplary video description file indicates the different copies of the film in each language, video quality, or other attribute. Each copy of the video is contained within a <content> tag which indicates the URL of the raw video file, and its metadata that distinguishes it from the remaining <content> tags. For example, an additional <content> tag (not in the above example) may be added which provides a URL to a high-definition version.

It will be appreciated that a XML video description file may point to many versions of the same video file (as shown with many <content> tags). The media server 16 selects the most appropriate <content> for the client 14's request by matching as many MAT tags as possible. In one embodiment, where the client media attributes include a preferred media content format attribute, the media file is selected by matching the media content format of the media file to the preferred client media content format attribute. Those skilled in the art would appreciate that there are many ways of matching MAT tags to <content> tags and dealing with mismatches. If there is no direct match, the media server 16 may either select the <content> tag that matches as much of the MAT tag as possible, or it may alternatively reply to the user with an error. In this example, the media server 16 selects the English version of the movie and extracts the URL tag (<url>).

In step 112, the media server 16 determines whether the media file identified in step 110 is already present its own cache. If so, the media server 16 proceeds to step 116 (described later).

In step 114, the media server 16 obtains (e.g. downloads) the media file selected in step 110. For example, the media file may be downloaded by following the extracted URL from the <content> section.

In step 116, the media server 16 engages a transcoding entity to transcode the media file into a format that satisfies the client MAT, thus generating a transcoded media segment file. In one embodiment, the media file is transcoded into a format that matches that client media attributes as much as possible (e.g., the exact bit rate asked by a client 14 may not be matched by transcoder). The transcoding entity may be may be a program running on the media server 16, or it may be a program running on a separate computer. The transcoding entity itself may have a local cache that allows it to bypass the transcoding operation to return a previously transcoded file.

In one example, the transcoding entity is transcoding software running on the media server 16. The transcoding software decodes the original data into an intermediate uncompressed format. This intermediate uncompressed format may be Pulse-code modulation (PCM) for audio data and YUV or RGB format for digital data. Those skilled in the art will appreciate that there are many ways of storing intermediate uncompressed digital media. From this intermediate step, the uncompressed data may be re-encoded into the desired format.

In another example, the transcoding entity may be a digital signal processing (DSP) chip which performs the transcoding operation in hardware. The chip may either be a general purpose DSP chip programmed to perform the desired transcoding operation, or it may be a specialized digital processor which is hard-coded to perform the desired transcoding operation.

In a further example, a transcoding entity may additionally provide a number of pre-processing or post-processing filters which may include but are not limited to video de-interlacing, audio re-sampling, frame rate conversion, smoothing, and cutting. These filters improve the quality of the resulting digital media.

In step 118, the media server 16 selects a delivery method based on the client media transport format attributes, prepares the transcoded media segment file for delivery, and communicates a location where the prepared transcoded media segment file may be accessed by the client. As a non-limiting example, the delivery method may be HTTP, RTSP, FTP, BitTorrent, or other communication protocols.

If the delivery method chosen is HTTP and the client transport format attributes indicated that the transcoded media segment file needs to be split into segments (as in the splitsec attribute in the <delivery> tag of the MAT), the media server 16 engages a splitter entity to split the transcoded file into segments. Each segment represents a complete file that may be viewed. The media server 16 then engages a merging entity to merge the segments into a file wrapper containing all of the segments.

If the delivery method chosen is HTTP, the media server 16 then uploads the prepared transcoded media segment file to a suitable media server 16 capable of serving the video file over HTTP. For example, a web media server 16 (such as Apache) or the Amazon™ S3 file service can be used as the video serving media server 16.

The media server 16 then responds to the client's request by sending a response XML file that indicates the location of the prepared transcoded media segment file (i.e. the transcoded media segment file prepared in a format that is suitable for transport). An example response can look like following (XML Listing 3):

XML Listing 3: Example Response

```
<response>
    <media>
        <content-url>
            http://aws.s3.com/video/34546KBK234_01.jig
        </content-url>
        <off>20506</off>
        <len>10240</len>
        <index-url>
            http://aws.s3.com/video/34546KBK234.xml
        </index-url>
    </media>
</response>
```

In the above example, the content-url tag points to the transcoded and merged media segment file. The offset and length indicates the portion of the content-url file the client 14 needs to download for the requested media segment. Preferably, the media server 16 also sends an index-url tag which points to an index XML file that provides the index of the individual segments within this merged file. Using the index-url tag, a client 14 can download the index XML file and can determine the offsets and lengths of all segments within the content-url file. This allows the client 14 to skip to any position in the video file by simply reading the file from a certain offset. It should be noted that the entire index-url file can be embedded within the actual content-url file as well as the header, i.e. the index-url does not need to be an external file.

As an alternative example, where the media server 16 selects RTSP as the delivery mechanism, the media server 16 uploads the transcoded media segment file (the split/merge steps will not be required) to an RTSP media server 30. The media server's response in this case may look like the following XML response file (XML Listing 4):

XML Listing 4: Example Response

```
<response>
    <media>
        <content-url>
```

-continued

```
            rtsp://somelocation.com/34546KBK234_01.3gp
        </content-url>
    </media>
</response>
```

It will be appreciated by those skilled in the art that other transport protocols may be used. When HTTP/FTP/BitTorrent protocols are used, the client 14 is treating the video file is exactly like any other file and progressively downloading it. When RTSP protocol is concerned, then the client 14 is no longer treating the video as a file to be downloaded, rather it uses the RTSP protocol to download bits of video file in a real-time manner.

An adaptive HTTP streaming approach may be employed as the protocol, wherein the media server 16 prepares several transcoded copies of the video, split into small segments typically on the order of a few seconds long (where the transcoded copies are compatible with the client media attributes). Each copy may be at a different resolution allowing transmission to happen at a number of different bandwidths. If the network transfer speed is too slow, the client 14 may detect its current data rate and directly access or download segments from the server without require that the server to re-transcode the media file. In such a case, the index (e.g. the XML index) provides information on other available data rate segments on the server, for example by providing with references to other index XML files.

In one embodiment, the client may monitor the effective data rate that it is receiving while downloading a media file from a server. If the client detects significant changes in data rate (which could occur, for example, if a cell phone switches from a 3G wireless coverage to a 2.5G wireless coverage or vice-versa), then in its next request to the server, it can modify the <audiobitrate> and <videobitrate> values in the MAT specification according to the current data rate. This will allow the server to provide a lower or a higher quality video clip in real-time to the client as per client's specified MAT. This will effectively allow the client to provide an automatic video quality adjustment as per the current network data rate so that an ongoing media delivery session can proceed seamlessly.

In another embodiment of the invention, the server may record delivery and/or playback usage statistics related to a media content item, or related to a specific media file related to a media content item. For example, such statistical data may be employed to determine the relative popularity of selected media content items and/or media files. Preferably, statistical data relating to the delivery and/or playback of media content items enables tracking of the media content files irrespective of their format or location.

Prior art systems such as YouTube™ cater for video clients that must be able to play videos in the format YouTube has created its content. The method described herein allows a client 14 to stream videos from web sites like YouTube™ even if it is not capable of playing Flash™ content, or playing with the video formats the source file is encoded in. Many mobile clients are not capable of long form contents (specially entry level devices). The method described herein allows playing long form content on such devices. Further, it will be appreciated that the resulting video file that the client 14 receives may not be present when the initial request was made. In this sense, system 10 allows for dynamic media transfer. In comparison, when a client 14 accesses a media site such as YouTube™ for video, it receives a static video file which was prepared before the request is made.

In a preferred embodiment of the present invention, a method is provided for enabling the client 14 to resume media playback after a disconnection has occurred. Following the disconnection event, the client attempts to reconnect to media server 16 when disconnected. Preferably, the client 14 need not access the same media server 16 or the same transfer protocol when reconnecting. Accordingly, the source of the video file may be seamlessly switched from the point of the user without requiring user intervention.

It will be appreciated that client media requests such as the example in XML listing 1 may represent either an initial connection request or a reconnection request. In this way, a client 5 may send the same request when it initially connects and every time it gets disconnected, with the requested starting point of the media segment representing the point of disconnection during a previous playback session. The MAT included in each request may specify more than one allowable video format, so the response to each request may provide a different (but allowable) video format. This flexibility is hidden from the user and increases the chance of maintaining a continuous video stream.

Therefore, the system 10 includes a video streaming technique whereby a user's single video streaming session is actually composed of many intermediate sessions with potentially multiple media servers 16 using more than one delivery techniques and video formats. Such intermediate sessions are completely transparent to the end user who only sees one video session. Existing systems typically deal with single session between a client 14 and a media server 16 for a particular video file.

Preferably, the client 5 is only aware of the Internet address of the media server 16 and the media server 16 implements the protocol that the client is following for communicating VCID, MAT, and other information. This protocol is stateless as far as the media server 16 is concerned. The client 5 keeps track of all the possible state information (how long the clip has been played, etc.) so that it can initiate the next request.

Figure 3:
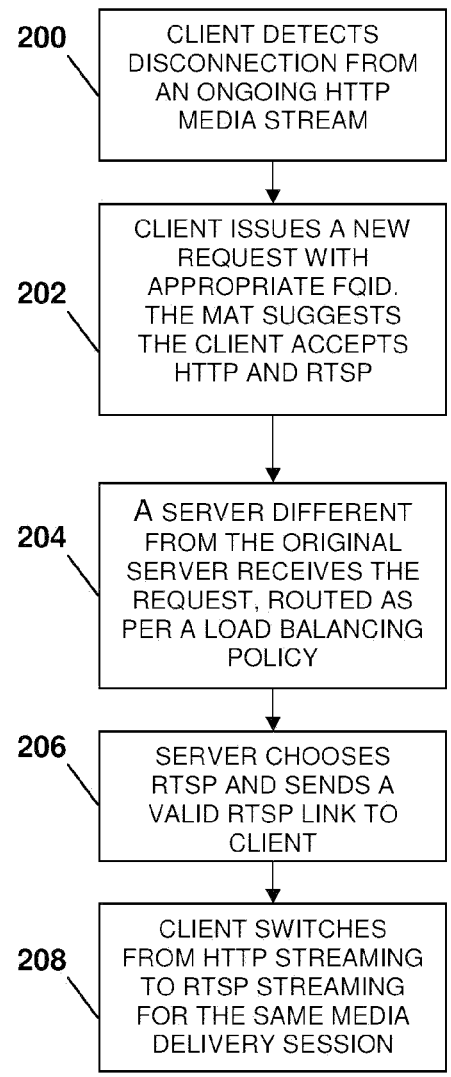
FIG. 3 is a flow chart diagram illustrating a video transmission that is interrupted.

This embodiment is illustrated by an exemplary method shown in FIG. 3. In step 200, a client 14 detects that it has been disconnected from an ongoing video stream sent via HTTP. Those skilled in the art will appreciate many means of detecting disconnection, such as the media server 16 exceeding a timeout response time. In step 202, the client issues a new request, for example, as in XML Listing 1, wherein the <delivery> tags indicates that the client media transport format attributes include both RTSP and HTTP. In step 204, a media server different from the original media server 16 receives the request, routed as per a load balancing policy. In step 206, this media server chooses RTSP and sends a valid RTSP link to the client. It will be appreciated that RTSP may be chosen because the media server may only support RTSP. Alternatively, if the new media server supports HTTP, then the same transfer protocol may be used as before the client 14 was disconnected in step 200. In the present example, however, the media server selects RTSP streaming, and in step 208, the client 14 receives a response as in XML Listing 4 which provides a RTSP stream.

It should be appreciated that in preferred embodiments, the client request for a media file segment to be delivered by the media server. In its request to the media server, the client provides all the transport formats it supports via the MAT. The media server may choose any of the transport formats as suggested in the MAT and preferably has no knowledge of previous delivery mechanisms used by the client.

Preferably, the media server 16 does not keep track of any session information of the client between successive requests. In other words, each client request is unique and can be handled by any media server and not necessarily an initial media server which serviced a previous request. In the above examples, the media server plays the role of a proxy media server whereby it transcodes or obtains a requested media file, uploads it to a traditional media server (e.g., web server, Amazon™ S3 server, RTSP server, etc.) and then redirects the client 14 by sending an appropriate response.

It will be appreciated that the response does not need to contain URL pointers to media file. The media server may respond with the media file segment along with its response, thus playing the role of a web server and a video streaming server. When a client is disconnected from its file media server from which it was receiving the transcoded media segment file, it communicates with the media server 16 passing in a VOID and MAT to resume the streaming operation. As noted above, since this request is completely an independent request, the media server may choose a delivery mechanism that is different than the previous request.

Users of the system may watch portions of a given media segment using different clients. For example, a user may watch a portion of a media segment on a cell phone and the remainder of the video on a desktop computer. More specifically, a user may stop playback of a delivered media segment during playback on a client device. When the client stops the media segment, it saves the media content item and the time at which the playback was stopped (e.g. the VOID), and may upload this information to the media server or to a web account associated with the user. Once uploaded, the user may subsequently download the VCID from a different client and initiate the playback of the remainder of the media segment on a different client. Alternatively, the user may download the VCID to the same client to resume watching at a later time. This is applicable when the client 14 is a web browser and may not store the VCID on the user's hard drive. An example of hand-off between clients is illustrated in FIG. 4.

Figure 4:
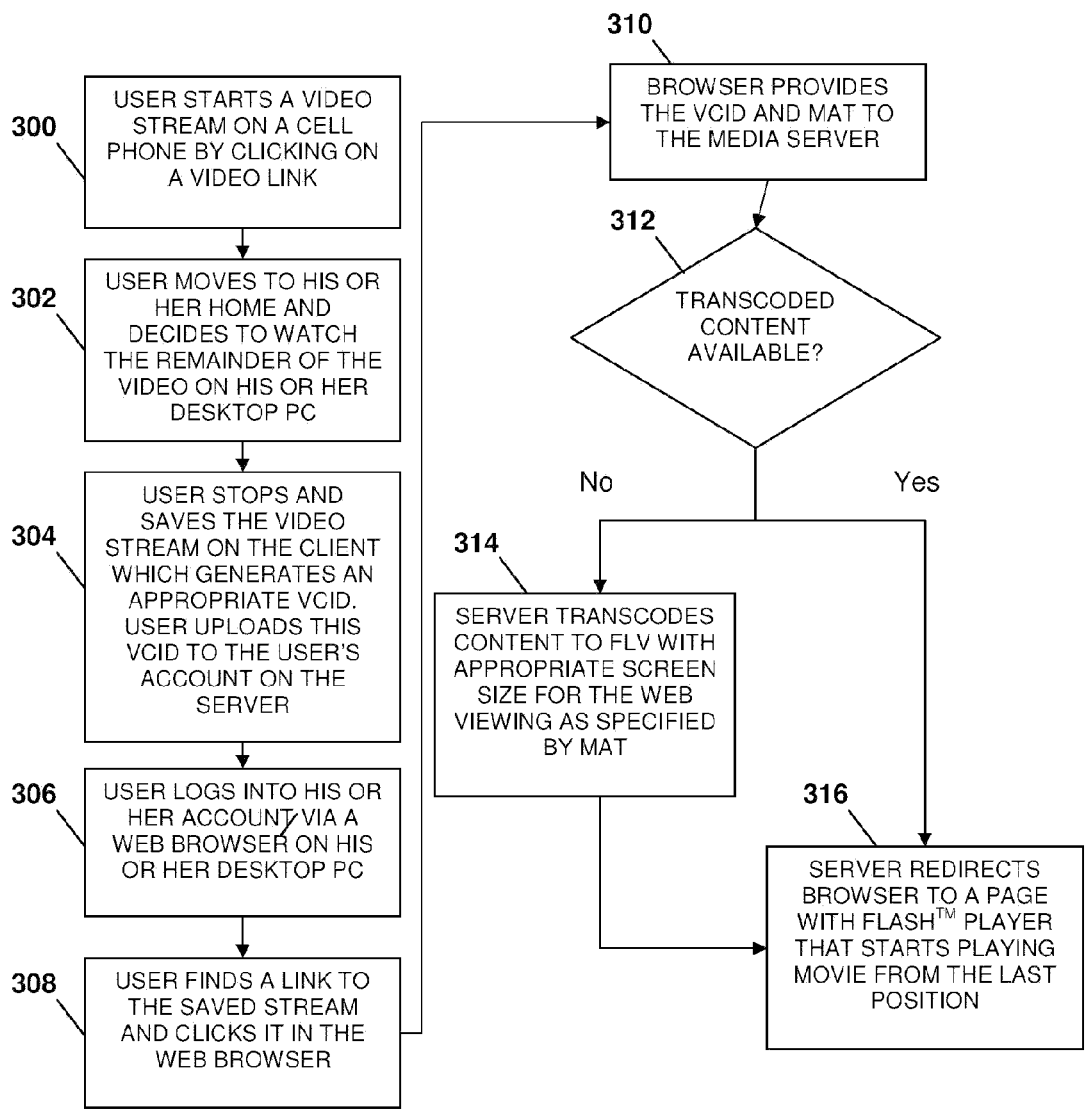
FIG. 4 is a flow chart diagram illustrating a hand-off of a video transmission between more than one client.

Referring to FIG. 4, in step 300, a user starts streaming of a full-length movie on a client 5 which comprises a mobile device in this example. In step 302, the user reaches his or her home and wishes to watch the remainder of the movie on his or her desktop computer. The user instructs the client to stop playing the video and to save the video location to his or her web account. Each user may have a web account associated with the system that may be accessed by the media server and by the client. The client generates a VCID which indicates the {VID, Off, Len}, i.e. video identifier, time offset, remaining time. The VOID is uploaded to the user's web account by the client 14 which may be accessed by the media server. It will be appreciated that the VCID may be either sent to the media server or to another web server having access to the user's account. In step 306, the user may log onto his or her web account via a web browser on his or her desktop PC. In step 308, the user obtains the uploaded VOID from his or her web account in the form of a hyperlink. In step 310, the browser sends a VCID to a media server 16 along with a MAT for the browser, which indicates the browser playback capabilities. The browser has different capabilities from a cell phone and may be represented by a different MAT. In step 314, the media server 16 checks whether the transcoded content is available in the desired format as specified by the sent MAT. In step 314, if the transcoded content is not available, the server sends a request to the media transcoder 18 to transcode the content to FLV format with appropriate screen size for web viewing as specified by MAT. In step 316, if the transcoded content is available or was transcoded in step 314 to the desired format (which is FLV in this example), the server redirects the browser to a page with a Flash™ player that starts playing the video from the last position (i.e. offset from the FQID sent in step 304). It will be appreciated that the steps indicated in FIG. 4 are merely exemplary and are stated for illustrative purposes.

As noted above, the media server preferably does not keep track of state information as far as streaming sessions are concerned; it is preferably only the client that keeps track of this information. When handing off between different clients, the client playing the video may upload the VCID to the user's account which may be optionally stored on media server or it may be stored on another server. When the user logs into his or her account, the client may obtain all pending sessions by downloading the VCIDs associated with the user account. The user may select a video, which causes the client to upload the associated VCID to the media server to initiate a new video streaming session.

The system includes provisions for broadcasting videos to multiple heterogeneous devices. Users may send other users VCID tags which allow the other users to watch the same video starting from the same offset. In this sense, multiple users may watch the same video stream broadcast. The user may send VOID by SMS, email, instant messaging applications, web site posts, blog sites, or by other communication means. This enables video broadcasting to multiple recipients possibly using different types of devices (e.g. mobile phones, PC desktops, smart TVs, set-top boxes, etc.). The users receiving the VCID must have a copy of the client application which runs on a client device and allows communication with server and streaming by the methods described above. It will be appreciated that each of the users receiving the same video does not need to use the same protocol or view the video in the same language. Each user initiates a new session, which may use any protocol indicated allowable by the MAT sent by the user's client.

While exemplary embodiments provided above have focused primary on the delivery of video media segments, it is to be understood that media content items, media clips, and media files as described herein may comprise any form of a digitized media file, including audio and images. In one embodiment, the media file may be a splash or background image for a media presentation device such as a mobile phone. Accordingly, the above embodiments enable a user of a client device to access a wide range of image for display on the client device, even through the images may not be initially formatted for the client device. By providing its media attributes to a server, a client device thus may obtain image files with device-specific custom formatting. This allows, for example, a publisher to publish a single version of an application that automatically brands itself with images in appropriate sizes based on a client device's display size and image capability.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

I claim:

1. A computer implemented method of dynamically preparing media content for delivery from a server to a client, said client comprising a client device and a media application for providing media playback on said client device, said computer implemented method comprising the steps of:
receiving media attributes from said client, said media attributes comprising one or more playback formats compatible with said client and one or more transport formats compatible with said client;
receiving from said client a request to provide a media segment comprising a selected segment of a selected media content item, said request defining a starting offset of said media segment, said request having been provided after said client was disconnected while streaming a previously generated prepared transcoded media segment, wherein said starting offset is an offset during said previously generated prepared transcoded media segment when said streaming of said previously generated prepared transcoded media segment was disconnected;
identifying a source where a media content file relating to said selected media content item is stored;
obtaining said media content file from said source;
dynamically transcoding the media content file to generate a currently transcoded media segment file comprising a transcoded segment of said media content file, wherein said currently transcoded media segment file comprises a playback format selected from said media attributes;
selecting a transport format from said media attributes; and
preparing said currently transcoded media segment file for delivery according to said transport format.

2. The computer implemented method according to claim 1 wherein the media attributes include the current network data rate, and wherein the transcoded media segment file is dynamically obtained with a resolution suitable for the current network data rate.

3. The computer implemented method according to claim 2 wherein the media content file is dynamically transcoded to provide a plurality of transcoded media segment files, each transcoded media segment file having a different resolution, such that the transcoded media content file with the resolution that is suitable for the current network rate can be dynamically obtained.

4. The computer implemented method according to claim 1 wherein at least one of said media attributes is selected from a group consisting of frame rate, resolution, aspect ratio, encoding rate, audio codec, and video codec.

5. The computer implemented method according to claim 1 wherein the source of said media content file is a remote third party media source.

6. The computer implemented method according to claim 1 wherein said media attributes further comprise a content format;
wherein said step of identifying a source comprises identifying one or more sources where media content files related to said selected media content item are stored; and
wherein said step of obtaining said media content file from said source comprises selecting a media content file from said media content files, wherein said selected media content file comprises a content format selected from said media attributes.

7. The computer implemented method according to claim 6 wherein at least one of said media attributes is selected from a group consisting of content language, content edition, content subtitles, and content censorship.

8. The computer implemented method according to claim 6 wherein said request comprises metadata associated with semantic content of said selected media content item.

9. A computer implemented computer implemented method of dynamically receiving media content on a client, said client comprising a client device and a media application for providing media playback on said client device, said computer implemented method comprising the steps of:

communicating client media attributes from said client to a server, said media attributes comprising a playback format and a transport format compatible with said client;

receiving from said server a list of available media content items;

receiving input from a user, the input selecting a media content item from said list and identifying a media segment of said media content item by selecting a starting offset;

communicating with said server to request dynamic preparation of said media segment;

receiving from said server a location of a prepared transcoded media segment file comprising a transcoded media segment file prepared in a format for delivery to said client, wherein said transcoded media segment file comprises a transcoded segment of a media content file related to said media content item, and wherein said transcoded media segment file comprises a playback format selected from said media attributes, and wherein said prepared transcoded media segment file comprises a transport format selected from said media attributes; and obtaining said transcoded media segment file from said location for playback on said client device;

wherein when playing of said transcoded media segment file on said client device is interrupted, said method further comprises the steps of:

recording an offset in said transcoded media segment file when the interruption occurred; and establishing communication with another server, wherein said media content item is available from said another server;

communicating said client media attributes to said another server;

identifying a new media segment of said media content item by selecting a starting offset corresponding to said offset in said transcoded media segment file when said interruption occurred;

communicating with said another server to request dynamic preparation of said new media segment;

receiving from said another server a location of a new prepared transcoded media segment file comprising a new transcoded media segment file prepared in a format for delivery to said client, wherein said new transcoded media segment file comprises a transcoded segment of said media content file related to said media content item, and wherein said new transcoded media segment file comprises a playback format selected from said media attributes, and wherein said new prepared transcoded media segment file comprises a transport format selected from said media attributes; and obtaining said new transcoded media segment file from said location for playback on said client device.

10. The computer implemented method according to claim 9 wherein at least one of said media attributes is a playback format attribute selected from a group of consisting of frame rate, resolution, aspect ratio, encoding rate, audio codec, and video codec.

11. The computer implemented method according to claim 9 wherein at least one of said media attributes is a transfer protocol attribute selected from a group consisting of hypertext transfer protocol, real time streaming protocol, file transfer protocol, and adaptive hypertext transfer protocol streaming.

12. The computer implemented method according to claim 9 wherein said media attributes further comprise a content format, and wherein said media content file related to said media content item comprises a content format selected from said media attributes.

13. The computer implemented method according to claim 12 wherein at least one of said media attributes is a content format attribute selected from a group consisting of content language, content edition, content subtitles, and content censorship.

14. The computer implemented method according to claim 9 wherein when playing of said transcoded media segment file on said client device is interrupted, said method further comprises the steps of:

recording an offset in said transcoded media segment file when the interruption occurred;

re-establishing communication with said server; and obtaining said transcoded media segment file from said location for playback on said client device.

15. The computer implemented method according to claim 9 wherein said list comprises a first list, and wherein prior to said step of receiving from said server said first list of available media content items, the following steps are performed:

communicating with said server to access a user account associated with said user;

receiving a second list of media content items comprising media content items previously viewed by said user;

wherein said step of receiving input from said user to select a media content item from said first list further comprises the step of receiving input from said user to select a previously viewed media content item from said second list.

16. The computer implemented method according to claim 15 wherein said previously viewed media content item was stopped during playback by said user during a previous viewing session, wherein an offset at which playback of said media content item was stopped is recorded in said user account; and wherein said step of receiving input from said user for identifying a media segment of said previously viewed media content item by selecting a starting offset comprises the step of:

receiving input from said user for selecting said offset at which playback of said media content item was stopped.

17. The computer implemented method according to claim 16 wherein said client is different than a client used during said previous viewing session.

18. The computer implemented method according to claim 9 wherein said list comprises a first list, and wherein prior to said step of receiving from said server said first list of available media content items, the following steps are performed:

communicating with said server to access a user account associated with said user;

receiving an additional list of media content items from another user;

wherein said step of receiving input from said user for selecting a media content item from said first list further comprises the step of receiving input from said user for selecting a media content item from said additional list.

* * * * *